United States Patent [19]
Myles et al.

[11] 3,984,924
[45] Oct. 12, 1976

[54] VIBRATORY SIMULATOR MOTION SYSTEM

[75] Inventors: Walter Edward Myles, Alexandria, Va.; James Anthony Sansonetti, Ellicott City, Md.

[73] Assignee: The Singer Company, Binghamton, N.Y.

[22] Filed: June 23, 1975

[21] Appl. No.: 589,377

[52] U.S. Cl. .................................. 35/11; 35/12 P
[51] Int. Cl.² .......................................... G09B 9/04
[58] Field of Search ............... 35/11 R, 11 A, 12 P, 35/12 K, 12 W, 22 R; 272/16, 17, 18; 273/86 E; 46/1 C

[56] References Cited
UNITED STATES PATENTS

| | | | |
|---|---|---|---|
| 3,486,242 | 12/1969 | Aronson | 35/11 A |
| R27,051 | 2/1971 | Cappel | 35/12 P |

Primary Examiner—William H. Grieb
Attorney, Agent, or Firm—Ronald Reichman; James C. Kesterson

[57] ABSTRACT

This invention is a motion system for use with simulators, primarily vehicle simulators, which provides random oscillatory motion to simulate the vibration encountered on such vehicles as trains, subway systems, trolley cars, etc. The motion system comprises a fixed base and a movable platform supported on that base at three primary points. Two points laterally spaced from each other support the motion platform on springs and a third support at the other end of the platform comprises a single ball support. Intermediate the pair of spring supports and the single ball support is a motion producing member such as a hydraulic cylinder.

4 Claims, 3 Drawing Figures

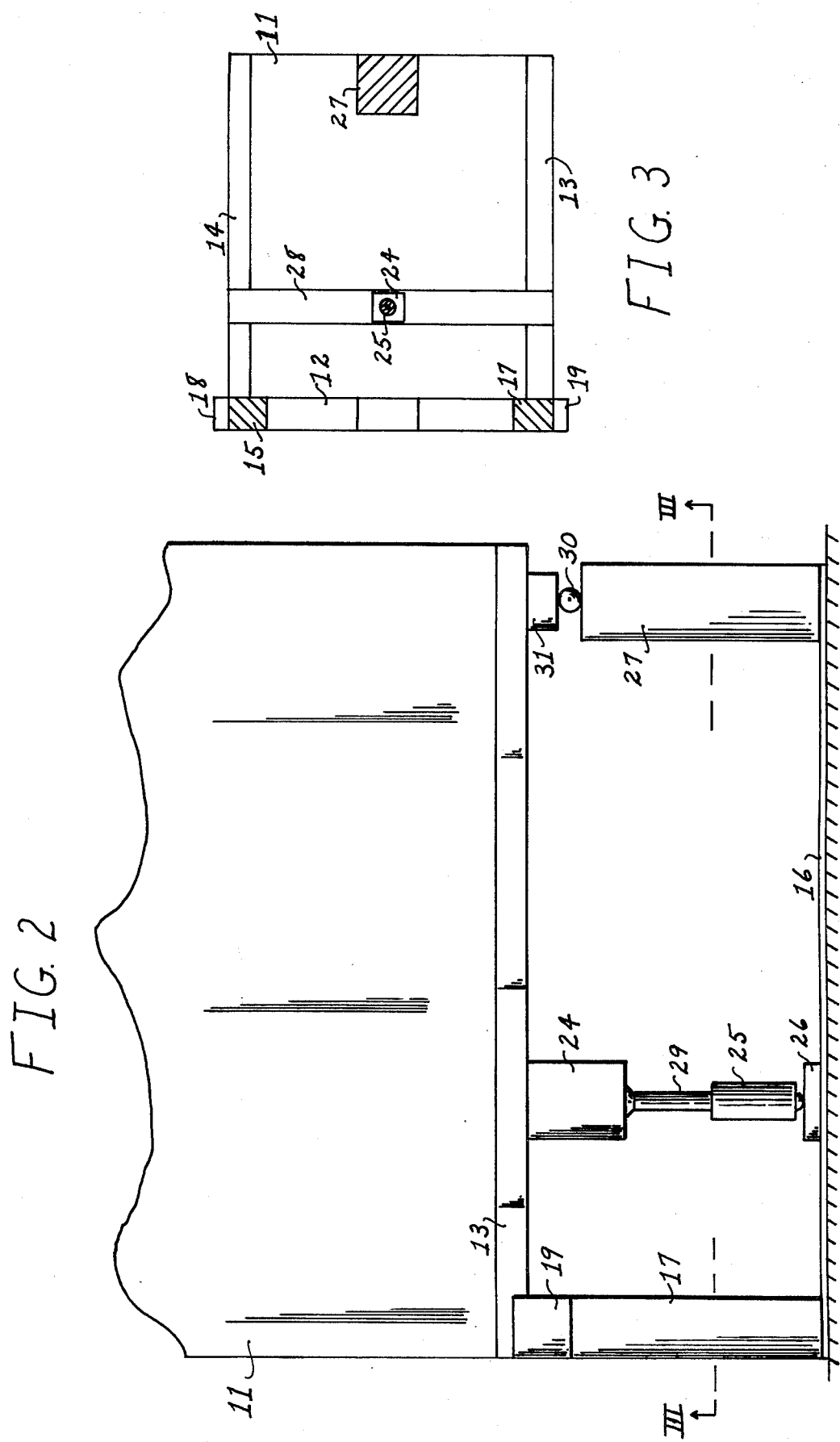

VIBRATORY SIMULATOR MOTION SYSTEM

BACKGROUND OF THE INVENTION

1. Field of the Invention

This invention relates to movable platforms and, more particularly, to platforms which may be used in systems duplicating the operation of complex vehicles or other systems.

A simulator use for training purposes generally comprises a portion which recreates the environment in which the trainee will find himself in the actual operational equipment as closely as possible. In a fixed station, this equipment may comprise a control and panel board containing all of the control devices for operating a manufacturing facility of some type, or it may comprise the portion of a complex vehicle in which the trainee would find himself when driving or controlling the vehicle. For many years it has been felt that the more realistic the environment in which the trainee is trained, the better the training itself would be. As one aspect of such a realistic environment, many systems for training vehicle operators have incorporated a motion platform of one sort or another.

2. Prior Art

Motion platforms in the past have been of many different types. The early vehicle simulators were those which simulated aircraft because aircraft were the most complex vehicles to operate and simulators for training operators were considered more necessary for aircraft than for other vehicles. In simulating the operation of aircraft, it has always been felt that the three rotational freedoms of motion — pitch, yaw and roll — were the primary motions to be simulated. In more recent years, the motion platforms for training aircraft operators have become more and more complex culminating in the more recently developed motion platforms which actually move in all six degrees of freedom — three rotational and three transitional.

SUMMARY OF THE INVENTION

Simulators have proven themselves as excellent training devices. Where simulators were, at one time, utilized only for training operators of the most complex systems, smaller and simpler simulators and other training systems have been developed for training operators of all sorts of systems. One of the more recent fields to utilize simulators for training purposes is that of the railroad engineers. Operating a heavily loaded freight train over terrain which varies drastically in slope and elevation requires a substantial amount of skill. The early engineers spent many years learning their skills on the job as coal tenders and firemen. With labor presently very expensive, the traditional method of training railroad engineers on the job over a period of years becomes too costly, and simulators are being used. A railroad engine moves in a confined direction. The only real freedom of motion provided the engine except for that along the track is the motion induced by irregularities in the rails and in the roadbed. This type of motion often amounts to a random vibration. In order to create an atmosphere in which an engineer trainee feels at home, the railroad simulators must have a means for creating this vibratory motion under the control of the instructor. This invention provides such a motion system.

It is an object of this invention to provide a new and useful training device.

It is another object of this invention to provide a new and useful training device for use in training vehicle operators.

It is a further object of this invention to provide a new and useful training device for use with railroad simulators.

It is still a further object of this invention to provide a new and improved motion system.

Further objects and advantages of this invention will become more apparent as the following description proceeds, which description should be considered together with the accompanying drawings.

BRIEF DESCRIPTION OF THE DRAWINGS

FIG. 2 is a side elevational view of the motion system shown in FIG. 1.

FIG. 3 is a plan view partially in section taken along the line III—III of FIG. 2.

DESCRIPTION OF A PREFERRED EMBODIMENT

Figure 1:
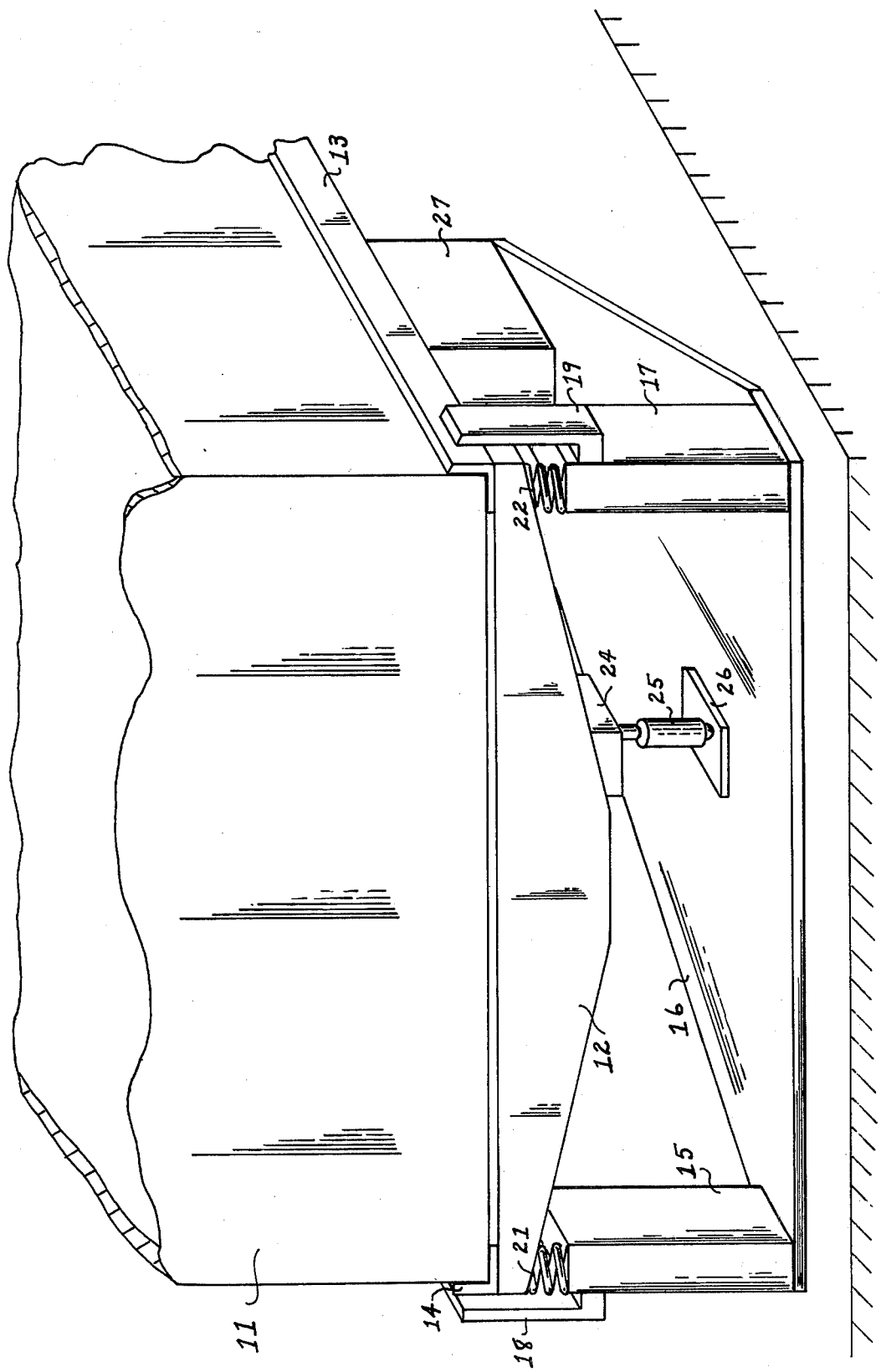
FIG. 1 is a perspective view of a portion of a motion system of this invention.

Referring now to the drawings in detail, the reference character 11 designates the cab of a vehicle being simulated. For purposes of this description, it can be assumed that the vehicle being simulated is a subway car. The body of the cab 11 rests on angles 13 and 14 which, in turn, are supported at one end on a large beam 12. The beam 12 rests upon springs 21 and 22 which are supported by piers 15 and 17. Members 18 and 19 are attached to the outer sides of piers 15 and 17 to provide stops for lateral motion of the cab 11. If desired, bumpers may be mounted on the inside of the members 18 and 19 to provide a resilient cushioning effect. The piers 15 and 17 rest upon a base plate 16 which may be formed of steel or any other suitable construction material. Also mounted on the plate 16 is a large pier 27 which is centrally located transversely of the cab 11 but at the opposite end, longitudinally, from the piers 15 and 17. Reference to FIGS. 2 and 3 shows the longitudinal displacement of the piers 17 and 27, with FIG. 3 showing that the piers 15 and 17 are located at the outer edges of the cab 11, whereas the pier 27 is situated towards the center of the other end of the cab. Spaced between the piers 15 and 17 and the pier 27 is a beam 28 which carries a depending support 24. Immediately below the support 24 resting on the base plate 16 is a base 26. One end of a hydraulic cylinder 25 is mounted on the base 26 and the free end of a piston 29 is attached to the depending member 24. Thus, the cylinder 25 and piston rod 29 separate the base 26 from the depending member 24. At the back end of the cab 11, a ball 30 of any suitable bearing material is supported on the pier 27 and a second depending member 31 rests on the ball 30. Not shown in the drawings are rubber cushions which surround the ball 30 to cushion and quiet the operation of the apparatus.

In summary, a simulated vehicle cab 11 rests upon a suitable framework which comprises angles 13 and 14 and beams 12 and 28. The framework is supported upon a three-point mounting system which comprises two piers 15 and 17 at one end of the cab and a single pier 27 centrally located at the other end of the cab. The entire structure rests upon a base plate 16. A hydraulic cylinder 25 having a piston rod 29 exerts forces between a base 26 and the bottom of a structural member 24 mounted on the cab 11.

The apparatus shown in the drawings is designed to simulate as closely as possible the random vibrations in six freedoms of motion; namely, three angular motions, pitch, roll, and yaw, and three linear motions, lateral, longitudinal, and vertical, produced by the various irregularities found in a roadbed and rails of a rail-carried vehicle. Such a vehicle can be a regular railroad train, a subway car, a trolley car, or anything similar. The entire system has a three-point mount where the single mounting point at one end of the simulated cab is supported on a universal joint illustrated by the ball 30. As mentioned above, the ball 30 can be supported in rubber cushioning material to provide a damping effect on the vibrations and also to reduce the noise levels. However, it should be borne in mind that one end of the vehicle is supported at a single universal joint. The other end of the vehicle is resiliently supported at the two outer corners. As shown in the drawings, piers 15 and 17 of any suitable construction may be used or large coil springs directly mounted upon the floor or other base can be used. So far, the description has described a simulated vehicle compartment resiliently supported on three points. However, the compartment comprises an unbalanced mass on those three points. The hydraulic cylinder 25 provides the motion-creating apparatus for the structure described above. As is common in simulator motion systems, the hydraulic cylinder is controlled from a computer (not shown) which is used to simulate the operation of the apparatus, through suitable amplifiers and valves, to control the flow of fluid pressure which is applied to the cylinder 25. The apparatus for accomplishing this is not new and will not be described at this point. Upon instructions from the computer, the pressure control valves in the hydraulic system will open and close to permit hydraulic fluid to enter and leave the cylinder 25. The cylinder 25, preferably, is a double-acting cylinder which means that the piston contained within the cylinder 25 has two active surfaces and hydraulic fluid may be applied to either side of the piston at any time causing the piston to move in either direction. Motion of the piston is transmitted through the piston rod 29 to the depending member 24 and to the cab structure 11 itself. The operation of the cylinder 25 may be varied in both amplitude and frequency, imparting to the cab 11 forces which can be controlled in both size and timing. Since the cab 11 is supported on a resilient universal joint 30 at one end and upon resilient mounts 21 and 22 at the other end, it is free to vibrate in response to the operation of the cylinder 25. Also, since the cab 11 is not balanced on its three support points, the forces applied by the cylinder 25 cause the cab 11 to vibrate in a random manner. Thus, intermittent operation of the single cylinder 25 produces in the cab 11 a vibration in six degrees of freedom which is similar to that which is encountered in a rail-borne vehicle. The control signals generated by the simulation computer produces the proper valve openings at the proper intervals to produce the frequency of vibration desired.

The above specification has described a new and improved motion system which is designed primarily to reproduce the vibration encountered in rail-borne vehicles. It is realized that a reading of the above specification may indicate to those skilled in the art additional ways in which the principles of this invention may be utilized without departing from its spirit. It is, therefore, intended that this invention be limited only by the scope of the appended claims.

What is claimed is:

1. Apparatus for simulating the random simultaneous vibratory motion encountered in rail-borne vehicles, said apparatus comprising first, second and third support means, a generally rectangular personnel compartment, resilient means for supporting one end of said personnel compartment upon said first and second support means, a single universal resilient mounting means supporting the other end of said personnel compartment on said third support means, and a hydraulic cylinder mounted off-center under said personnel compartment to impart intermittent forces thereto, said personnel compartment comprising an unbalanced mass on said first, second and third support means.

2. The apparatus defined in claim 1 wherein said personnel compartment comprises a simulated vehicle cab.

3. The apparatus defined in claim 1 wherein said hydraulic cylinder is externally controlled.

4. The apparatus defined in claim 1 wherein said resilient means are a plurality of springs.

* * * * *